(12) United States Patent
Ottillinger

(10) Patent No.: US 10,773,637 B2
(45) Date of Patent: Sep. 15, 2020

(54) TOLERANCE-COMPENSATION FRAME FOR JOINING AROUND HEADLAMPS

(71) Applicant: Bayerische Motoren Werke Aktiengesellschaft, Munich (DE)

(72) Inventor: Klaus Ottillinger, Rehling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 16/267,622

(22) Filed: Feb. 5, 2019

(65) Prior Publication Data

US 2019/0168659 A1  Jun. 6, 2019

Related U.S. Application Data

(63) Continuation of application No. PCT/EP2017/066240, filed on Jun. 30, 2017.

(30) Foreign Application Priority Data

Aug. 11, 2016 (DE) .................. 10 2016 214 979

(51) Int. Cl.
*B60Q 1/04* (2006.01)
*B62J 6/02* (2020.01)
(Continued)

(52) U.S. Cl.
CPC ............. *B60Q 1/0466* (2013.01); *B62J 6/02* (2013.01); *B62J 17/02* (2013.01); *B62K 19/30* (2013.01)

(58) Field of Classification Search
None
See application file for complete search history.

(56) References Cited

U.S. PATENT DOCUMENTS

| 4,356,536 A | 10/1982 | Funabashi et al. |
| 2006/0062003 A1 | 3/2006 | Lee |

(Continued)

FOREIGN PATENT DOCUMENTS

| CN | 1364706 A | 8/2002 |
| CN | 101327759 A | 12/2008 |

(Continued)

OTHER PUBLICATIONS

Chinese-language Office Action issued in counterpart Chinese Application No. 201780029104.7 dated Nov. 14, 2019 with English translation (nine (9) pages).

(Continued)

*Primary Examiner* — Britt D Hanley
(74) *Attorney, Agent, or Firm* — Crowell & Moring LLP

(57) ABSTRACT

An apparatus and method for indirectly mounting and adjusting at least one motorcycle cladding element around a motorcycle light located on a motorcycle frame element includes comprising a tolerance compensation frame which is fastened by a first set of fastening elements in a partly assembled state such that it can move in a tolerance-compensation direction in relation to the motorcycle frame element, and is fixed by the first set of fastening elements in a final assembly state such that the tolerance compensation frame cannot move in relation to the motorcycle frame element. The at least one motorcycle cladding element is fastened by a second set of fastening elements to the tolerance compensation frame, and a covering unit that covers the first and second sets of fastening elements is fastened to the tolerance compensation frame by a third set of fastening elements.

11 Claims, 2 Drawing Sheets

(51) Int. Cl.
*B62J 17/02* (2006.01)
*B62K 19/30* (2006.01)

(56) References Cited

U.S. PATENT DOCUMENTS

2006/0077676 A1   4/2006   Ohzono
2008/0316762 A1   12/2008  Shiokawa et al.

FOREIGN PATENT DOCUMENTS

| DE | 10 2004 057 132 A1 | 7/2006 |
| EP | 0 869 052 A2 | 10/1998 |
| EP | 2 332 812 A1 | 6/2011 |
| EP | 2 514 635 B1 | 10/2013 |
| JP | 2002-205674 A | 7/2002 |
| JP | 2006-88939 A | 4/2006 |
| JP | 4339525 B2 | 10/2009 |
| JP | 2011-178243 A | 9/2011 |

OTHER PUBLICATIONS

Japanese-language Office Action issued in Japanese Application No. 2019-507098 dated Feb. 26, 2020 with English translation (three (3) pages).

International Search Report (PCT/ISA/210) issued in PCT Application No. PCT/EP2017/066240 dated Sep. 15, 2017 with English translation (five (5) pages).

German-language Written Opinion (PCT/ISA/237) issued in PCT Application No. PCT/EP2017/066240 dated Sep. 15, 2017 (five (5) pages).

German Search Report issued in counterpart German Application No. 10 2016 214 979.2 dated Feb. 15, 2018 with partial English translation (12) pages).

TOLERANCE-COMPENSATION FRAME FOR JOINING AROUND HEADLAMPS

CROSS REFERENCE TO RELATED APPLICATIONS

This application is a continuation of PCT International Application No. PCT/EP2017/066240, filed Jun. 30, 2017, which claims priority under 35 U.S.C. § 119 from German Patent Application No. 10 2016 214 979.2, filed Aug. 11, 2016, the entire disclosures of which are herein expressly incorporated by reference.

BACKGROUND AND SUMMARY OF THE INVENTION

The invention relates to a tolerance compensation frame for the indirect mounting and adjustment of motorcycle trim elements around a motorcycle light.

A very wide variety of methods and embodiments of means for mounting motorcycle trim elements in the front region on the headlight section are already known from the prior art. Here, it is important for the visual appearance that the trim elements have homogeneous gap sizes with respect to the headlight or with respect to the motorcycle light. Here, in particular, the gap sizes on the left and right of the light are significant for a visually appealing and symmetrical appearance. Setting said gap sizes proves laborious, time-consuming and difficult, however, in the case of most of the known methods and means. The individual spacings of each trim element usually have to be adapted individually and by hand with respect to one another and with respect to the headlight. Since, however, lean process steps are preferred in production, and said process steps have to be inexpensive, rapid and with a satisfactory result, many of the methods and means from the prior art are not suitable. Methods which provide a tolerance compensation directly on the trim means are likewise usually unsuitable, since the means for tolerance compensation often remain visible subsequently. For example, slots as means for the tolerance compensation on the trim parts provide a visually less appealing appearance. Furthermore, reworking is often necessary in the case of conventional methods and means, which increases invested time and therefore costs.

The invention is therefore based on the object of overcoming the above-described disadvantages and providing a simple, inexpensive solution which facilitates and accelerates the mounting and the setting of the joint sizes in comparison with conventional solutions.

To this end, according to the invention, a tolerance compensation apparatus for the indirect mounting and adjustment of at least one motorcycle trim element around a motorcycle light on a motorcycle frame element is proposed. Here, the motorcycle frame element is configured integrally by a motorcycle frame which serves as a carrier for further assemblies, or the motorcycle frame element is arranged on and/or fastened to the motorcycle frame. The motorcycle trim element forms at least two faces; a connecting face which serves for connection to the tolerance compensation frame, and a deflecting face which serves to deflect air and to protect a rider. The motorcycle light can comprise, for example, both headlights and an integral arrangement of a plurality of elements. Here, the tolerance compensation apparatus comprises a tolerance compensation frame which is fastened by way of a first set of fastening elements such that it can be displaced with respect to the motorcycle frame element in a tolerance compensation direction in a partially mounted state. This takes place by way of a first predefined position of the fastening elements of the first set of fastening elements. A gap size between the motorcycle light and the tolerance compensation frame is then set in a homogeneous manner in the partially mounted state. A gage is used to this end. The tolerance compensation frame is fastened by way of the first set of fastening elements such that it cannot be displaced with respect to the motorcycle frame element in a final mounted state. In the final mounted state, the fastening elements of the first set of fastening elements are situated in a second predefined position. The at least one motorcycle trim element is capable of being fastened or is fastened to the tolerance compensation frame by way of a second set of fastening elements.

One advantageous development provides that a covering unit can be fastened, and is fastened in the final mounted state, to the tolerance compensation frame by way of a third set of fastening elements. The covering unit covers the first and second sets of fastening elements, at least one part of the at least one motorcycle trim element and at least one part of the tolerance compensation frame in the final mounted state. Here, the covering unit has the task of covering fastening elements and locations which should not lie in a visible region, and of providing a visually appealing surface. At the same time, the covering element represents a protection against detaching of the covered elements and against weather influences.

A further advantageous development provides that in each case one fastening elements of the third set of fastening elements comprises a latching hook which is configured by the covering unit and a latching lug which is configured by the tolerance compensation frame. Here, the latching hook is configured to latch into the latching lug. As a result, the fastening elements are configured in such a way that they are not visible from one side and do not disrupt the visual appearance in the final mounted state, since the covering unit is not interrupted, for example, by a hole.

It is likewise advantageous for one embodiment if the motorcycle frame element configures at least one lug. Each lug configures in each case one displacement elements. In addition, the lug provides a stop face, against which the tolerance compensation frame is pressed by way of the first set of fastening elements in the final mounted state, all the stop faces lying in one plane and defining a common stop face. In the partially mounted state, the tolerance compensation frame can be displaced parallel to the stop face.

One development variant is advantageous, in the case of which the respective displacement elements is a slot. The slot is oriented along the tolerance compensation direction. By virtue of the fact that the slot of each lug is oriented in the tolerance compensation direction, a displacement is possible only in the tolerance compensation direction. As an alternative, instead of a slot, a hole with an enlarged diameter in comparison with a fastening element of the first set of fastening elements would also be possible, as a result of which a displacement is made possible in each direction parallel to a common stop face of the lugs.

Furthermore, it is advantageous for one design variant if the tolerance compensation frame is of substantially annular configuration. Furthermore, the tolerance compensation frame configures, over at least one section of its circumference, a fastening face which is oriented orthogonally with respect to a rotational axis of the tolerance compensation frame and/or parallel to the common stop face of the lugs and configures at least one hole. The hole serves to provide a leadthrough for the fastening elements of the first set of fastening elements. Here, a part of a fastening elements of the first set of fastening elements bears in a flush manner on the fastening face.

Furthermore, it is advantageous for one design variant if a fastening elements of the first and second set of fastening elements comprises in each case a bolt and a nut. In each case one bolt of the first set of fastening elements reaches, in the partially mounted state and in the final mounted state, through the displacement elements, for example the slot, of a lug and through the hole of a fastening face. In the partially mounted state, the nut is screwed on in such a way that a pressing force is not yet exerted between the lug and the fastening face or tolerance compensation frame. In the final mounted state, the nut is screwed onto the bolt with a predefined force, with the result that a pressing force is exerted between the lug and the fastening face or tolerance compensation frame, as a result of which the tolerance compensation frame cannot be displaced with respect to the motorcycle frame element. Furthermore, the first and second set of fastening elements can comprise further elements such as washers, spacer elements or bolt locks.

Furthermore, one development variant is advantageous, in the case of which the tolerance compensation frame at least partially surrounds the motorcycle light. An outer face of the motorcycle light, which outer face lies closest to the tolerance compensation frame, is at a spacing from an inner face of the tolerance compensation frame, which inner face lies closest to the motorcycle light, a first dimension of the spacing along the tolerance compensation direction, on one side of the motorcycle light, being a first gap size, and a second dimension of the spacing along the tolerance compensation direction, on an opposite side of the motorcycle light, being a second gap size, and the first and second gap sizes preferably being identical.

One development form, in the case of which the tolerance compensation frame configures at least one fastening lug for fastening the at least one motorcycle trim element, is likewise advantageous. The at least one motorcycle trim element can then be fastened to the tolerance compensation frame by way of the second set of fastening elements.

Furthermore, according to the invention, a method for mounting trim elements on a motorcycle in order to realize intended and identical gap sizes with the use of a tolerance compensation apparatus is proposed, the method for mounting comprising the following steps:
a) mounting of the tolerance compensation frame on the motorcycle frame element, on which the motorcycle light is mounted, as a result of which the partially mounted state is established,
b) orienting or adjusting of the tolerance compensation frame on the motorcycle frame element into a predefined position, preferably in such a way that the gap sizes are substantially identical and/or the motorcycle light provides a symmetrical appearance with respect to the tolerance compensation frame,
c) fixing of the position of the tolerance compensation frame on the motorcycle frame element by way of fixing of the fastening elements of the first set of fastening elements, with the result that the tolerance compensation frame is fixed non-displaceably on the motorcycle frame element. In the case of a screw connection as a respective fastening element of the first set of fastening elements, the bolt is braced against the nut with a predefined force which, as a result, presses the fastening surfaces on the tolerance compensation frame and the lugs of the motorcycle frame element against one another,
d) mounting of the at least one motorcycle trim element on the tolerance compensation frame by way of the second set of fastening elements,
e) final mounting of the covering unit by way of fixing of the covering unit on the tolerance compensation frame by way of the third set of fastening elements.

Said steps can optionally also be carried out in another sequence.

The features which are disclosed in the above text can be combined in any desired manner, insofar as this is technically possible and they do not contradict one another.

Other objects, advantages and novel features of the present invention will become apparent from the following detailed description of one or more preferred embodiments when considered in conjunction with the accompanying drawings.

The figures are diagrammatic by way of example. Identical designations in the figures indicate identical functional and/or structural features.

DETAILED DESCRIPTION OF THE DRAWINGS

Figure 1:
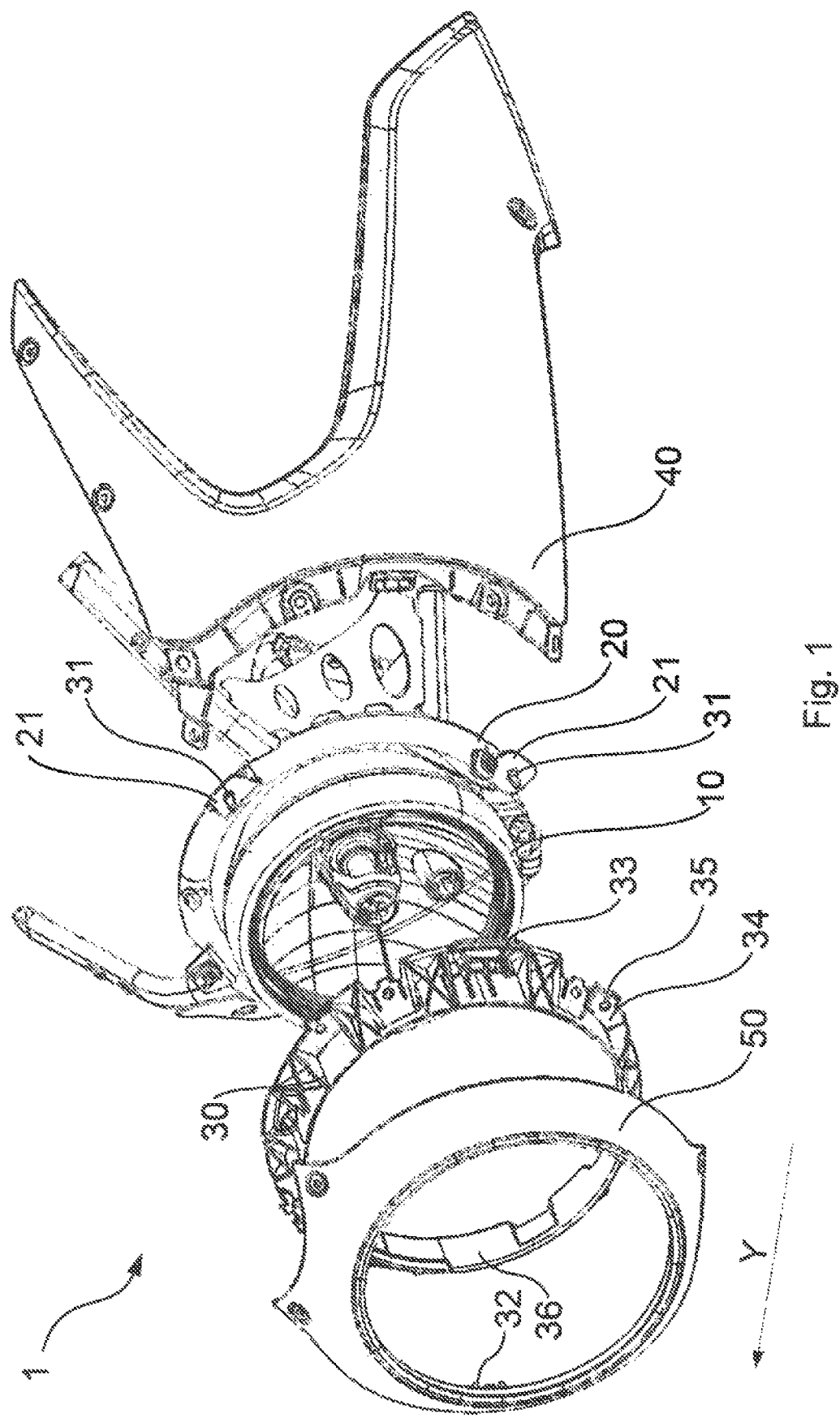
FIG. 1 shows a perspective exploded illustration of the tolerance compensation apparatus.

FIG. 1 shows the tolerance compensation apparatus 1. The motorcycle frame element 20 with the mounted motorcycle light 10 can be seen. A motorcycle trim element 40, a tolerance compensation frame 30 and a covering unit 50 are shown spaced apart herefrom in an exploded manner. The motorcycle frame element 20 is configured as a substantially toroidal and C-shaped frame for the motorcycle light 10, the lugs 21 for fastening the tolerance compensation frame 30 being configured by the toroidal part of the motorcycle frame element 20 or being connected via a connection, such as a welded connection. The lugs 21 in each case have a slot in a manner which extends in the tolerance compensation direction Y. The subsequent possible displacement travel along the tolerance compensation direction Y is dependent on the length of the slots. Furthermore, the motorcycle frame element 20 configures projections, against which the motorcycle trim element 40 bears in the final mounting state. The motorcycle light 10 is mounted on the motorcycle frame element 20, the motorcycle frame element 20 partially surrounding the motorcycle light 10, and the C-shape of the motorcycle frame element 20 being closed by way of the mounting elements, by way of which the motorcycle light 10 is mounted on the motorcycle frame element 20. The tolerance compensation frame 30 has a substantially annular shape, said tolerance compensation frame 30 configuring at least one fastening face 34 at its end which faces the motorcycle frame element, which fastening face 34 extends outward away from the tolerance compensation frame 30 and is orthogonal with respect to a central axis of the tolerance compensation frame 30. The tolerance compensation frame configures an inner face 36 on its inner side, which inner face 36 forms the face which is closest to the motorcycle light 10 in the partially mounted state and in the final mounted state. A plurality of reinforcing ribs extend between the outer face of the tolerance compensation frame 30 and the fastening face 34, and the face configures a hole 35. Furthermore, further faces with holes are configured by the tolerance compensation frame 30, to which faces the motorcycle trim elements 40 can be fastened by way of the second set of fastening elements. Said further faces in each case have a slot parallel to the central axis of the tolerance compensation frame 30 on both sides of a respective hole of the further faces. A sprung section is achieved as a result which makes easier mounting and an improved seat of the motorcycle trim elements 40 possible. For this purpose, the motorcycle trim elements 40 configure two faces, a connecting face and a deflecting face. The connecting face which serves for the connection to the tolerance compensation frame 30 configures at least one hole for this purpose. In addition, the deflecting face which serves to deflect air and to protect a rider is an essential design element of the motorcycle. The covering unit 50 forms a termination of the construction. The third set of fastening elements is therefore formed in such a way that it is not visible from the outside. For the mounting, therefore, at least one latching hook 32 of the covering unit 50 latches into a latching lug 33 of the tolerance compensation frame 30. Here, a first and second set of fastening elements are covered by the covering unit 50 and are thus protected against external influences and visibility. By way of its outer contour, the covering unit 50 forms a termination with respect to the motorcycle trim elements 40 and with respect to a windshield. The visible gap sizes of the motorcycle light 10 are determined by way of its inner contour. Since the position of the covering unit 50 with respect to the tolerance compensation ring is fixed by way of the third set of fastening elements, the ratio of the gap sizes of the tolerance compensation frame 30 to the motorcycle light 10 among one another is identical to the ratio of the gap sizes of the covering unit 50 to the motorcycle light 10. The symmetry of the gap sizes is therefore maintained.

Figure 2:
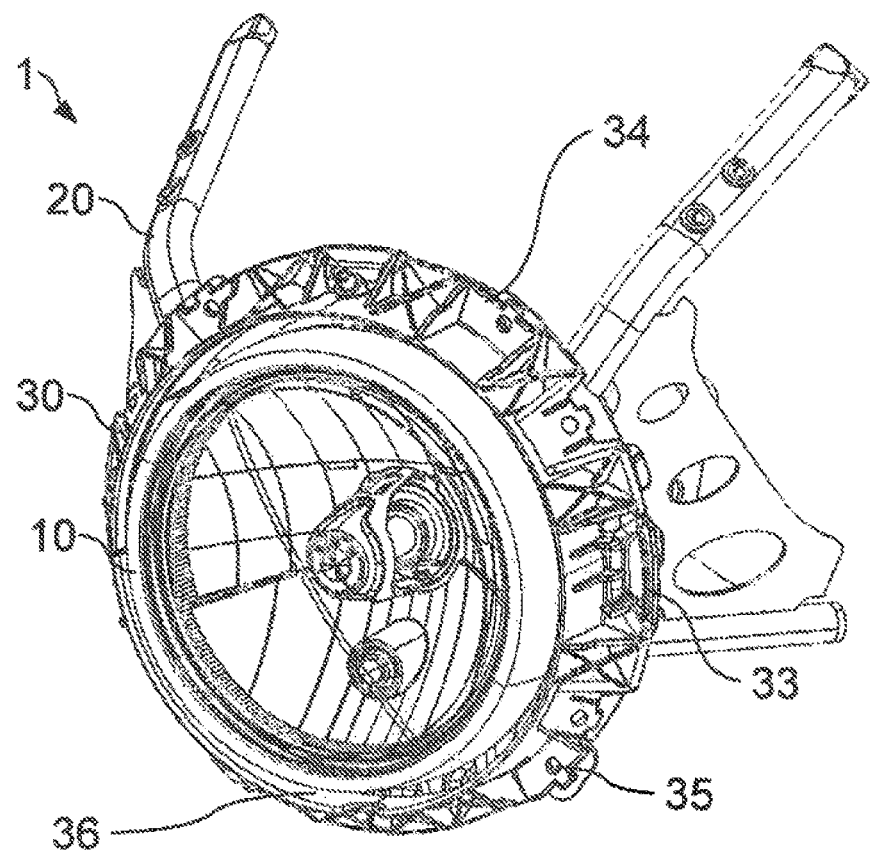
FIG. 2 shows a perspective illustration of the tolerance compensation frame with a motorcycle light and a motorcycle frame element.

FIG. 2 shows a part of the tolerance compensation apparatus 1. Essentially, the motorcycle frame element 20 with the motorcycle light 10 and the tolerance compensation frame 30 which is attached and oriented thereon is shown. Here, there is the same spacing, that is to say an identical gap size, on the left and right of the motorcycle light 10, at least in the compensation direction Y, between the inner face 36 of the tolerance compensation frame 30 and the circumferential face of the motorcycle light 10. Here, the further configuration of the parts which are shown corresponds to the form which is described in FIG. 1.

Figure 3:
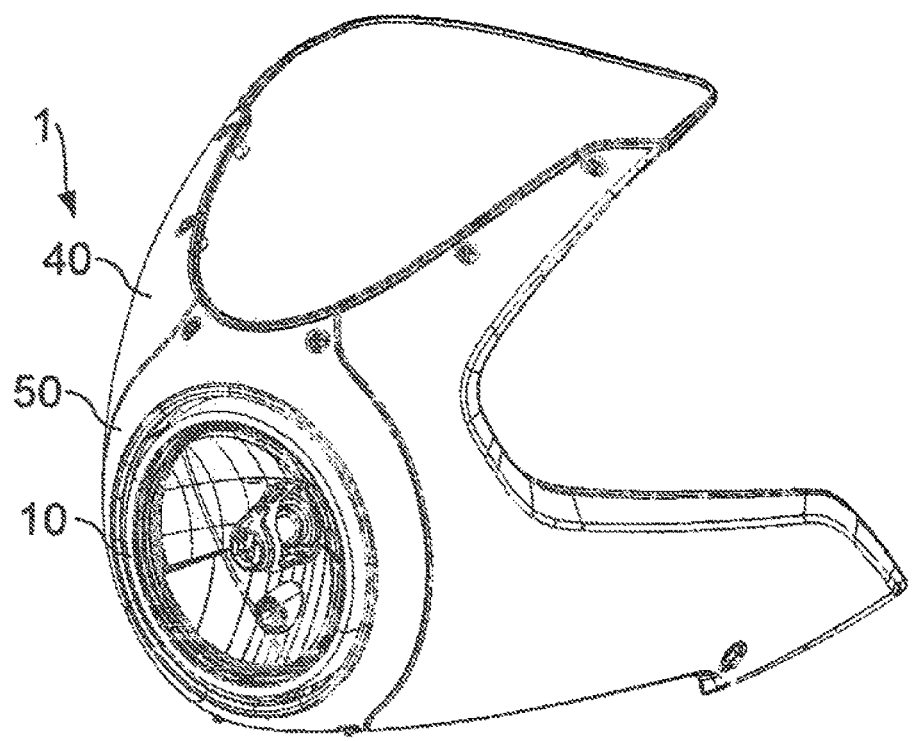
FIG. 3 shows a perspective view of the tolerance compensation apparatus in the final mounted state.

FIG. 3 shows the final mounted state, in the case of which the motorcycle light 10 is surrounded by the tolerance compensation frame 30, on which two motorcycle trim elements 40 are mounted, one on the left and one on the right of the motorcycle light 10. The regions, in which the sets of fastening elements are situated, are covered by the covering unit 50. There is an identical gap size on the left and right of the motorcycle light 10, that is to say in the compensation direction Y, between the inner contour of the covering unit 50 and the motorcycle light 10.

The foregoing disclosure has been set forth merely to illustrate the invention and is not intended to be limiting. For example, the tolerance compensation frame might not be fastened and/or might not be capable of being fastened to the motorcycle frame element, but rather to the motorcycle light. Since modifications of the disclosed embodiments incorporating the spirit and substance of the invention may occur to persons skilled in the art, the invention should be construed to include everything within the scope of the appended claims and equivalents thereof.

What is claimed is:

1. A tolerance compensation apparatus for the indirect mounting and adjustment of at least one motorcycle trim element around a motorcycle light on a motorcycle frame element, comprising:
a tolerance compensation frame
wherein
the tolerance compensation frame is configured to be fastened with respect to the motorcycle frame element by a first set of fastening elements such that the tolerance compensation frame is displaceable in a partially mounted state in a tolerance compensation direction and is not displaceable in a final mounted state, and
the tolerance compensation frame is configured to receive a second set of fastening elements that fasten the at least one motorcycle trim element to the tolerance compensation frame.

2. The tolerance compensation apparatus as claimed in claim 1, wherein
the tolerance compensation frame is configured to receive a third set of fastening elements when the tolerance compensation frame is in the final mounted state that fasten a covering unit to the tolerance compensation frame such that the covering unit covers the first and second sets of fastening elements, at least one part of the at least one motorcycle trim element, and at least one part of the tolerance compensation frame.

3. The tolerance compensation apparatus as claimed in claim 2, wherein
the third set of fastening elements includes a plurality of latching pairs, each latching pair including a latching lug of the tolerance compensation frame configured to receive a respective latching hook of the covering unit.

4. The tolerance compensation apparatus as claimed in claim 3, wherein
the motorcycle frame element includes at least one lug at least one lug having tolerance compensation frame displacement elements.

5. The tolerance compensation apparatus as claimed in claim 4, wherein
the tolerance compensation frame displacement elements of each of the at least one motorcycle frame element lug is a slot arranged with a longitudinal slot axis parallel to the tolerance compensation direction.

6. The tolerance compensation apparatus as claimed in claim 5, wherein
the tolerance compensation frame configured to be substantially annular relative to the motorcycle light, and
the tolerance compensation frame over at least one section of a circumference of the tolerance compensation frame includes a fastening face arranged orthogonally with respect to a rotational axis of the tolerance compensation frame, the fastening face including at least one hole.

7. The tolerance compensation apparatus as claimed in claim 6, wherein
each of the first and second sets of fastening elements include at least one bolt and at least one nut configured to receive a respective one of the at least one bolt.

8. The tolerance compensation apparatus as claimed in claim 7, wherein
the tolerance compensation frame at least partially surrounds the motorcycle light,
an outer face of the motorcycle light is adjacent to an inner face of the tolerance compensation frame, a first spacing along the tolerance compensation direction on one side of the motorcycle light has a first gap size, a second spacing along the tolerance compensation direction on an opposite side of the motorcycle light has a second gap size, and the first and second gap sizes are substantially identical.

9. The tolerance compensation apparatus as claimed in claim 8, wherein the tolerance compensation frame includes at least one fastening lug for fastening the at least one motorcycle trim element.

10. A method for mounting trim elements on a motorcycle with the use of a tolerance compensation apparatus having a tolerance compensation frame configured to be fastened with respect to a motorcycle frame element by a first set of fastening elements such that the tolerance compensation frame is displaceable in a partially mounted state in a tolerance compensation direction and is not displaceable in a final mounted state, the tolerance compensation frame further being configured to receive a second set of fastening elements that fasten the at least one motorcycle trim element to the tolerance compensation frame, the method for mounting comprising the acts of:

mounting of the tolerance compensation frame in the partially mounted state on the motorcycle frame element when the motorcycle light is mounted on the motorcycle frame element with the first set of fastening elements;

orienting the tolerance compensation frame on the motorcycle frame element into a predefined position;

fixing of the position of the tolerance compensation frame in the final mounted state non-displaceably on the motorcycle frame element with the first set of fastening elements;

mounting the at least one motorcycle trim element on the tolerance compensation frame with the second set of fastening elements; and mounting the covering unit on the tolerance compensation frame with the third set of fastening elements.

11. The method for mounting trim elements as claimed in claim 10, wherein the tolerance compensation frame at least partially surrounds the motorcycle light, an outer face of the motorcycle light is adjacent to an inner face of the tolerance compensation frame, and the predefined position is a position in which a first spacing along the tolerance compensation direction on one side of the motorcycle light has a first gap size, a second spacing along the tolerance compensation direction on an opposite side of the motorcycle light has a second gap size, and the first and second gap sizes are substantially identical.

* * * * *